Aug. 22, 1967 — H. A. ROY, SR — 3,337,182
TOP ENTRY PLUG VALVE
Filed April 1, 1965 — 2 Sheets-Sheet 1
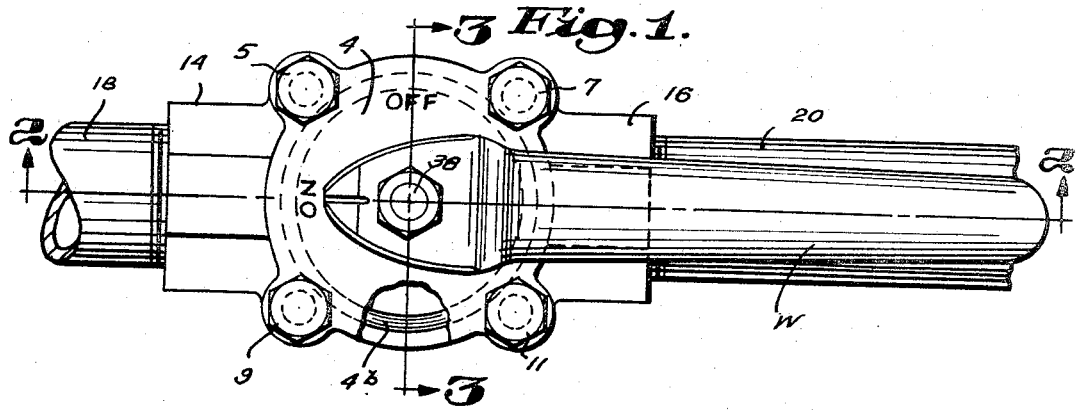
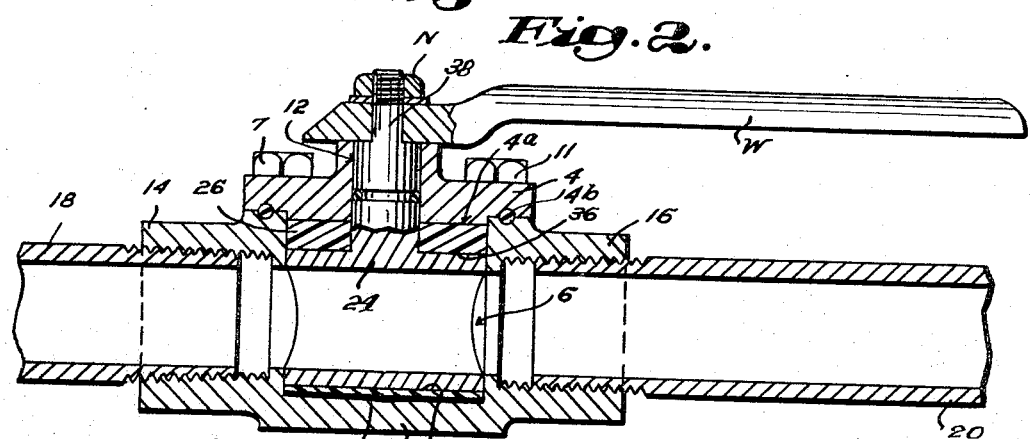
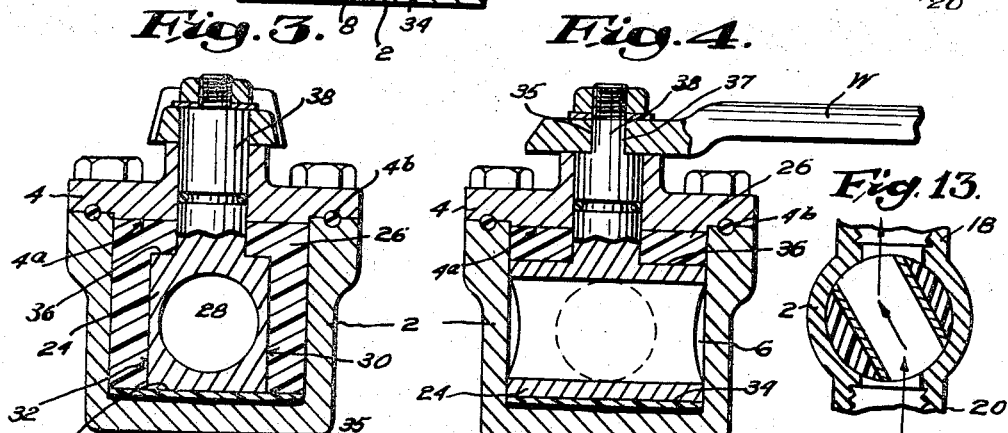
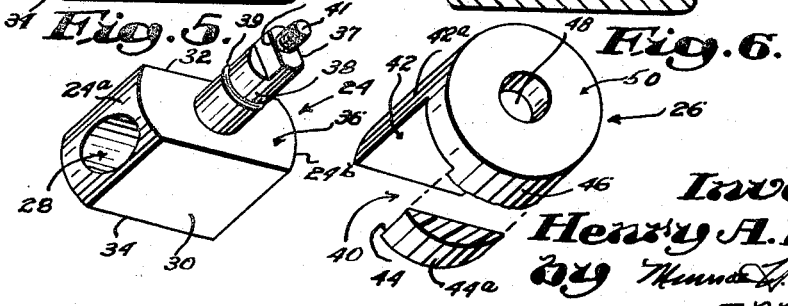
Inventor:
Henry A. Roy, Sr.
Attorney

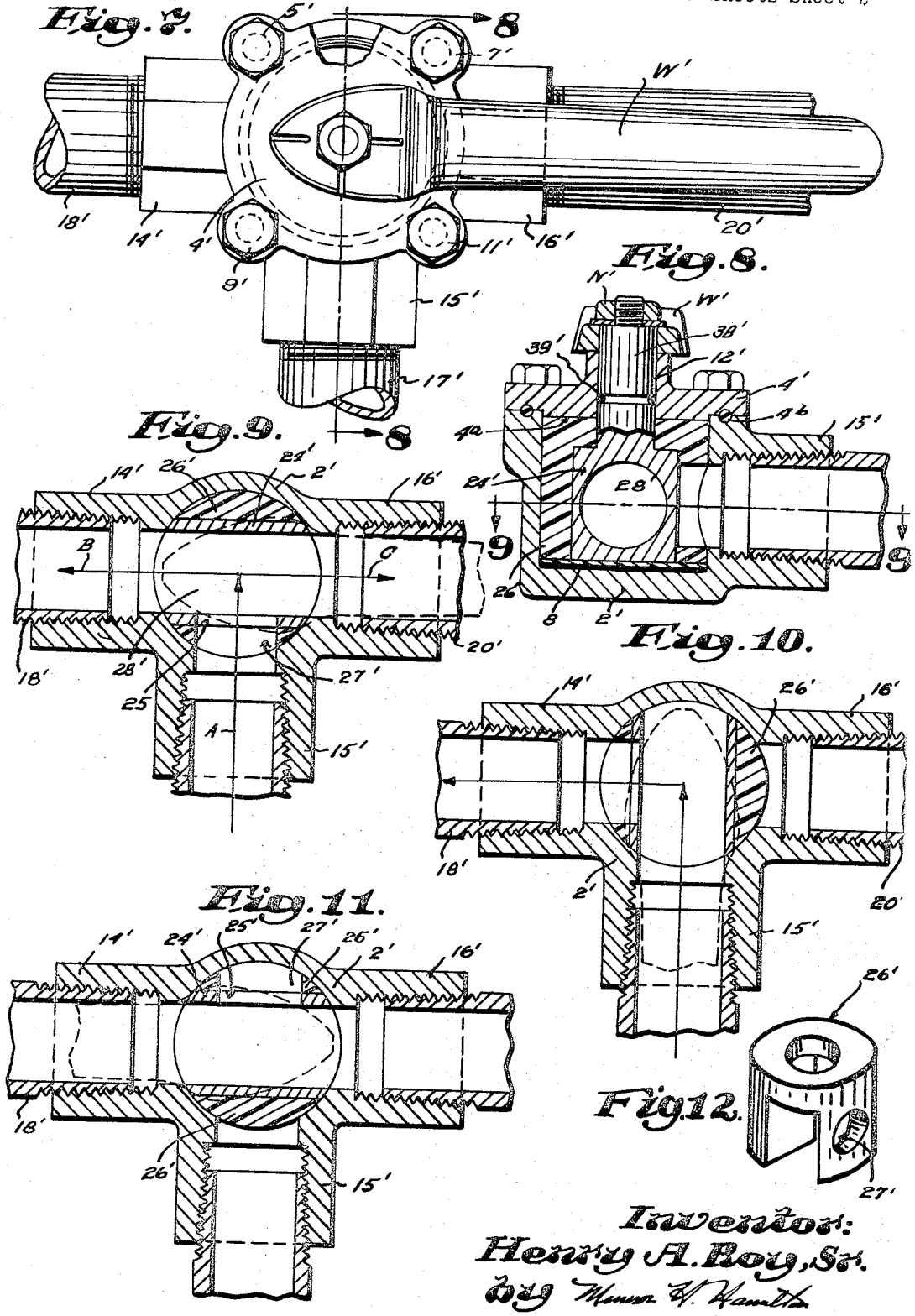

United States Patent Office 3,337,182
Patented Aug. 22, 1967

3,337,182
TOP ENTRY PLUG VALVE
Henry A. Roy, Sr., Peabody, Mass., assignor to Roi-Tech Valve Co. Inc., Peabody, Mass., a corporation of Massachusetts
Filed Apr. 1, 1965, Ser. No. 444,562
12 Claims. (Cl. 251—214)

ABSTRACT OF THE DISCLOSURE

A conduit body formed with inlet and outlet ports for conducting a flow of fluid therethrough is recessed to form a cylindrical chamber whose central axis extends substantially at right angles to the axes of the inlet and outlet ports. A closed space in the conduit body defined by the cylindrical chamber receives segmental valve means in sealing relationship with the chamber surfaces and the segmental valve means substantially fills the space defined by the cylindrical chamber. Included in the segmental valve means is a driver segment having a fluid passageway formed therethrough and a sealer segment arranged on the driver segment in straddled relationship therewith and movable with the driver segment to open and close the said inlet and outlet ports.

---

This invention relates to valves and, more particularly, to a plug type valve of the top entry class which can be easily inserted in a valve body or removed therefrom without disconnecting pipes or other conduit means.

In conventional plug type valves of the general class indicated, various difficulties are encountered involving excessive wear, leakage, lubrication requirements, handling characteristics, and various other problems.

It is a chief object of the invention to provide an improved plug type valve and to devise a valve body having novel sealer components which provide for greatly improved operating life with reduction in wear and elimination of leakage and other similar problems.

It is a further specific object of the invention to devise an interlocking valve assembly which can be installed and removed as one compact unit and which can exercise sealing effects at several different areas in a plug type valve structure.

I have found that these objectives may be realized by means of an interlocking segment type valve structure which includes an inner valve driver segment and a specially devised valve sealer segment arranged on the valve driver segment in straddled relationship. The arrangement of the parts is such that two different materials can be employed very effectively as hereinafter disclosed.

I have further found that the straddled association of the sealer segment provides for instantly moving the sealing segment into any desired position in the valve body and yet permits the sealer segment to be removed or installed with the device as a single unit.

An important feature of the invention is the provision in a unitary sealer segment of a plurality of sealer portions which may exercise a novel sealing effect at several different areas of a valve body.

These and other objects and novel features of the invention will be more fully understood from the following description of preferred embodiments selected for purposes of illustration and shown in the accompanying drawings, in which:

FIGURE 1 is a plan view showing the valve structure of the invention connected between two conduit members in a typical operative position;

FIGURE 2 is a cross sectional view taken on the line 2—2 of FIGURE 1;

FIGURE 3 is a cross sectional view taken on the line 3—3 of FIGURE 1;

FIGURE 4 is another cross sectional view similar to FIGURE 3 but showing the valve components in a different operating position;

FIGURE 5 is a detail perspective view of a valve driver segment of the invention;

FIGURE 6 is another detail perspective view of a valve sealer segment;

FIGURE 7 is a plan view of a modified form of segmental valve assembly which provides for three-way fluid flow;

FIGURE 8 is a cross section taken on the line 8—8 of FIGURE 7;

FIGURE 9 is another cross sectional view of the valve of FIGURE 7 in one operating position;

FIGURE 10 is a view similar to FIGURE 9 but showing the valve components in another operative position;

FIGURE 11 is a similar view of the valve but showing a third operating position;

FIGURE 12 is a detail perspective view of a sealer segment of the type employed in FIGURE 9; and FIGURE 13 is a detail cross sectional view of a sealer element in a throttling position in a cylindrical valve casing.

In the structure shown in FIGURES 1 to 6 inclusive, numeral 2 denotes a valve body which is formed with a cylindrical chamber 6 closed at its upper side by a bonnet 4, and having a flat circular end 8 which may, for example, be comprised by an end wall having a separate disc or insert of a synthetic resinous material supported thereagainst. The resinous disc is used to reduce the coefficiency of friction between the bottom of the valve body and other movable parts of my improved valve construction hereinafter disclosed.

The bonnet member 4 is secured to the valve body by fastenings as 5, 7, 9 and 11, and is formed with an opening centrally located therein at 12. At its underside the bonnet presents a bearing surface 4a which projects into chamber 6 very slightly. A sealing ring 4b or flat gasket extends around the bonnet and is adapted to lie in a groove in the valve body as shown in FIGURE 2.

At either side of the valve body 2 are provided tubular inlet and outlet portions 14 and 16 which intersect the cylindrical chamber 6 at right angles thereto. These tubular members 14 and 16 are designed to connect with conduit members 18 and 20 through which a flow of fluid material is conducted when the valve structure of the invention is in an open position.

In accordance with the invention, I provide a novel segmental valve assembly which is rotatably mounted in the cylindrical chamber 6 in a position to completely occupy all space therein. This segmental valve assembly includes two complementary bodies, each of which present arcuate surfaces engageable with the peripheral surface of the cylindrical chamber 6. One valve component consists of a specially formed driver segment indicated by the arrow 24 which is preferably made of steel, steel alloy or aluminum and the like and which is more clearly shown in FIGURE 5. A second valve component consists of a sealer segment indicated by arrow 26 as shown in FIGURE 6 and arranged on the driver segment in straddled relationship as shown in FIGURES 2, 3 and 4.

The driver segment 24 comprises a section of a cylinder formed by two planes which intersect the cylinder in spaced apart relation and parallel to the longitudinal axis of the cylinder at equal distances therefrom to define two opposite flat surfaces 30 and 32. Occurring between the flat surfaces 30 and 32 are two opposite arcuate surfaces 24a and 24b between which extend a fluid passageway 28.

At its top and bottom sides the driver segment is formed with flat bearing surfaces 34 and 36. From the bearing surface 36 is a stem 38 which extends upwardly as shown in FIGURES 2, 3 and 4. The stem 38 is provided with a sealing ring 39 and at its upper extremity, as shown in FIGURE 5, is formed with flat wrench holding surfaces 35 and 37 for supporting a wrench W. A threaded stud 41 is located at the extreme top to extend through a slot in wrench W and receive a locking nut N.

The sealer segment 26 comprises a bifurcated cylindrical body which is preferably made of a synthetic resinous material and which is shown in straddled relationship on the driver segment in FIGURES 2, 3 and 4. The sealer segment is also shown completely removed from the valve body in FIGURE 6. As will be noted from an inspection of the latter figure, the lower section of the cylindrical sealer element is cut away to provide a recess 40 and a pair of spaced sealer legs 42 and 44. The recess 40, occurring between the spaced sealer legs 42 and 44, is designed to receive therein the driver segment 24 in a snugly fitted manner such that the recess is completely filled and the arcuate surfaces 24a and 24b of the driver segment are complementary to and merge with the arcuate surfaces 42a and 44a of sealer legs 42 and 44.

At its upper end, as shown in FIGURE 6, the sealer segment is formed with an annular sealer section generally denoted by the numeral 46 and having located therethrough a circular stem opening 48 through which the stem 38 projects as suggested in FIGURE 2.

It will be observed that the top of sealer segment 26 presents a flat bearing surface 50 which is adapted to engage and rotate against the bearing surface 4a of the bonnet 4. Likewise the sealer legs 42a and 44a are of the same dimension as the driver segment 24, with the result that the bottom surfaces of these sealer legs 42a and 44a merge with and complement the bottom surface of the driver segment to thereby form a circular bearing area for engaging against the circular disc 8 in the valve body.

As noted above the driver segment is preferably constructed of steel or other relatively hard metal, while the sealer segment may be comprised of a synthetic resinous material of a relatively softer nature. As examples of synthetic resinous materials which can be used, there may be cited "Teflon," "Delrin," "Celcon," and "Buna N," and the like. Also the driver segment and sealer segments are constructed of a diameter slightly greater than the diameter of the cylindrical chamber in the valve body so that a relatively tight sealing fit is realized with the resinous material tending to be in a slightly compressed condition when installed. It will also be observed that the axial dimension of cylindrical sealer portion 46 exactly corresponds to the space between the bonnet 4 and the top surface 36 of the driver segment 24.

As a result of these dimensional relationships which are carefully built into the valve construction, it will be apparent that the driver segment and sealer segment cooperate to completely fill and seal all adjacent surfaces of the valve body chamber 6 and when the driver and straddled sealer segment is rotated, an extremely effective sealing and wiping action is maintained at all points of contact and hence any fluid material conducted through the passageway 28 is continuously excluded from the moving surface, and if the driver valve is positioned in an intermediate position such that fluid material comes into contact with a peripheral surface of the sealer legs, a desirable scavenging action can always take place when the driver segment is rotated to a closed position. Thus there is displaced all films of material into the passageway 28. This is best understood from an inspection of FIGURE 13 wherein the tightly fitted relationship of adjacent peripheral surfaces may be observed.

It will be apparent, therefore, that the sealer segment includes several different sealing surfaces. The arcuate sealing surfaces 42a and 44a are constantly in sealing engagement with the valve chamber periphery and when turned are in sufficiently tight engagement to wipe away material so that no deposits collect. Likewise the annular sealing portion 46 prevents any material from travelling upwardly in and around the bonnet. The inner surfaces 42 and 44 tightly engage and seal against the surfaces 30 and 32 of the driver segment.

Thus it will be observed that by reason of the straddled relationship of the sealer legs on the driver segment and by reason of the fact that the oversize diameter is employed, the sealer legs are constantly compressed against the driver to positively insure sealing action at all times. Also, the arrangement is such that a very convenient top entry valve arrangement is provided and when the bonnet is removed from the valve body the driver segment and sealing segment may be lifted out as a single unit without danger of separation. By encasing the driver segment with resinous materials of the type indicated above for the straddled sealer portions described, the combined assembly not only provides an improved seal at the inlet and outlet ports, but at the same time also allows a minimum of torque or turning force to move the assembly from "off" to "on" positions. It is also pointed out that all sides of both the driver segment and sealer parts are straight so that no tapered surfaces are present at any point to develop trouble or wear.

The combination of driver segment and sealer members described is found to desirably eliminate traps and cavities at all points in the valve, and bacteria is prevented from collecting, and clogging avoided.

I have also determined that the use of two different materials may be employed to vary the tolerance or fit of the valve components in the cylindrical chamber in accordance with dimensional changes involving expansion or contraction due to fluctuation in ambient temperature in localities where the valve is operating. This is due to the resinous material expanding and contracting differently than adjacent metal portions.

In FIGURES 7 to 12 inclusive, I have illustrated a modified form of valve in which a three-way sealing effect is provided for as distinguished from the two-way sealing accomplished with the form of the invention shown in FIGURES 1 to 6 inclusive.

The parts shown in the modification of FIGURES 7 to 12 correspond in general to the parts earlier described and are denoted by the same but primed numerals as shown. Thus a valve body 2' (FIGURE 9) is formed with a cylindrical chamber which is closed at its upper side by a bonnet 4' and the bottom of the chamber may be fitted with a plastic wafer or disc 8'. The bonnet is closed by fastenings 5', 7', 9' and 11' and has formed therein a central opening 12'. The undersurface of the bonnet has a bearing surface 4a'. A sealing ring 4b' is located as shown in FIGURE 8.

At either side of the valve body are tubular inlet and outlet portions 14' and 16', connecting with conduit members 18' and 20'. Also provided is tubular inlet portion 15' and a conduit 17'. Located in the cylindrical chamber of valve body 2' is a segmental valve assembly which generally corresponds to the valve assembly earlier described and includes a driver segment 24' and a sealer segment 26' also arranged on the driver segment 24' in straddled relationship as shown in FIGURES 9 to 11. The sealer segment is more clearly shown in FIGURE 12 removed from the valve body.

The driver segment 24' is formed in the manner already described and includes a stem 38' with sealing ring 39' and the stem supports a wrench W' as earlier noted held by a nut N'. Located through the driver segment is a fluid passageway 28'. Also formed through one side of the driver segment 24' at right angles to the passageway 28' and communicating therewith is a second passageway 25' more clearly shown in FIGURES 9 and 11 in two different positions in the valve body 2'.

Similarly the sealer segment 26' is formed through one of its sealer legs with a passageway 27′ which is arranged to register and communicate with the passageway 25′ in the driver segment 24′ when in straddled relationship therewith.

By means of these two additional passageways 25′ and 27′ it becomes possible to provide for either two-way or three-way flow. Thus in FIGURES 7, 8 and 9 the driver segment and sealer segments are positioned such that fluid may flow through the inlet portion 17′ as shown by the arrow A in FIGURE 9, and then along passageways 27′ and 25′ and thereafter out of the passageway 28′ in two different directions as suggested by arrows B and C.

In FIGURE 10, I have illustrated the driver segment and sealer segment turned clockwise through a 90° arc in which position fluid may flow through tubular part 15′ then through the valve body and out of tubular portion 14′ with the tubular portion 16′ being closed off.

In FIGURE 11 the driver segment is shown turned another 90° in a clockwise direction to close off the tubular portion 15′ and provide for flow of fluid through the tubular portions 14′ and 16′. Thus a three-way flow may be readily provided as desired by rotating the driver and sealer segments as indicated above.

The sealing surfaces and sealer portions of the driver segment 24′ and sealer segment 27′ are formed with the same arcuate sealing surfaces and function in the same manner as has already been described. It will be understood that the valve body and its segments may be varied in various other ways within the scope of the appended claims.

It should be observed that the valve construction of the invention is so designed that the valve sealer components may be used interchangeably in a flow line reversing the direction of the wrench W. A further important feature to be noted is the segmental seal design of the invention with a full top sealing annulus 46 which permits the valve to be used at higher pressure than valves with conventional sealing arrangements. The segmental seal with a full annular bearing top seal surface will resist very high pressures without cold flow of the material at the downstream end of the valve as is the case and problem with conventional valves.

I claim:

1. In a conduit body formed with inlet and outlet ports for conducting a flow of fluid therethrough, a valve retaining portion recessed to form a cylindrical chamber whose central axis extends substantially at right angles to the axis of said flow of fluid through the inlet and outlet ports, said cylindrical chamber being closed at one end, a bonnet member arranged to close the opposite end of the cylindrical chamber, segmental valve means rotatably mounted in the cylindrical chamber between the closed end and the said bonnet, said segment valve means occurring in sealing relationship with the cylindrical chamber surfaces and substantially filling the space between the bonnet and the said closed end as defined by the cylindrical chamber, and said segmental valve means including a driver segment having a fluid passageway formed therethrough and a sealer segment arranged on the driver segment in straddled relationship therewith and movable with the driver segment to open and close the said inlet and outlet ports.

2. A structure as defined in claim 1 in which the driver segment includes a stem which extends vertically upwardly through the straddled sealer segment and the bonnet.

3. A valve structure of the class described including a valve body having a cylindrical chamber formed therein and closed at one end, a bonnet member for closing the opposite end of the chamber, tubular inlet and outlet members communicating at right angles to the central axis of the cylindrical chamber at two opposite sides of the valve body, segmental valve means rotatably mounted in the chamber between the closed end and the bonnet, said segmental valve means occurring in sealing relationship with all chamber surfaces and substantially filling the space defined by the cylindrical chamber and included between the closed end of the chamber and the said bonnet member, said segmental valve means including a driver segment having a fluid passageway therethrough and a sealer segment including a circular top sealer section and depending arcuate sealer segment arranged at either side of the driver segment in interlocking relationship therewith and said sealer segment being movable with the driver segment to open and close the tubular inlet and outlet members.

4. An improved valve structure of the class described comprising a valve body formed with a cylindrical chamber which terminates at one side in a flat circular end surface, a disc of bearing material fitted in the cylindrical chamber against the said flat circular end surface, a bonnet for closing the opposite end of the chamber, inlet and outlet means communicating at right angles to the axis of the cylindrical chamber at two opposite sides of the valve body, segmental valve means rotatably supported in the cylindrical chamber in sealing relationship with the peripheral surface of the said chamber with its end surface, and with the flat surface of the bonnet and substantially filling the space defined by the cylindrical chamber and occurring between the bonnet and the said disc of bearing material, said segmental valve means including a driver segment and a sealer segment, said driver segment against having a fluid passageway extending therethrough in a position to communicate with the said inlet and outlet members in one position of rotation of the segmental valve means, said driver segment being further formed with a reduced driver end, said sealer segment including an annular sealer section through which the reduced end of the driver segment is received, and spaced apart arcuate sealer segments integral with the annular sealer section and sealably engaged with the driver segment at two opposite sides thereof, said arcuate sealer segments being movable by said driver segment end through a range of throttling positions to control flow of fluid material from the tubular inlet through the driver segment and into the tubular outlet.

5. A structure according to claim 4 in which the driver segment presents arcuate surfaces which are complementary to the curved surfaces of the arcuate sealer segments and cooperate therewith to form a continuous cylindrical scavenger surface for wiping away fluid material on an exposed part of said surface which may collect during passage of fluid through the valve.

6. A structure according to claim 4 in which the driver segment is comprised by a metal body and the sealer segment consists of a synthetic resinous material.

7. A structure according to claim 4 in which the driver segment is comprised by a metal body and the sealer segment consists of a synthetic resinous material, and said synthetic resinous material being responsive to temperature change to expand and provide a relatively tighter sealing relationship with the cylindrical chamber in a predetermined range of temperatures.

8. A segmental valve construction for use in a conduit body formed with inlet and outlet ports and a closed cylindrical chamber whose central axis extends at right angles to the axes of the said inlet and outlet ports, said segmental valve construction including a driver segment having cylindrical surfaces formed with a fluid passageway therethrough, a sealer segment arranged on the driver segment in straddled relationship therewith and presenting cylindrical sealing surfaces which are complementary with the cylindrical surfaces of the driver segment and which are movable with the driver segment to open and close the said inlet and outlet ports of the conduit body, a disc of bearing material for fitted engagement with one end of the closed cylindrical chamber of the conduit body, and said segmental valve construction being of a size and shape to substantially fill the space defined by the cylindrical chamber and to rotatably engage said disc of bearing material.

9. An improved valve structure comprising a valve body formed with a cylindrical chamber which terminates at one side in a flat cylindrical end surface, a bonnet secured to the casing and presenting a flat bearing surface at the top of the chamber for closing this member at an opposite side thereof, tubular inlet and outlet members communicating at right angles with the central axis of the cylindrical chamber at two opposite sides of the valve body, segmental valve means rotatably mounted in the cylindrical chamber in sealing relationship with the peripheral surface of the cylindrical chamber, its end surface, and the flat bearing surface of the bonnet, said segmental valve means substantially filling the space defined by the cylindrical chamber, said segment valve means including a driver segment and a sealer segment, said driver segment being formed with a fluid passageway therethrough which connects with the inlet and outlet members in one position of rotation of the segmental valve means, said driver segment being further formed with a reduced driver end which extends through the sealer segment and the bonnet, and said sealer element being movable with the driver segment and consisting of an annular section for sealably engaging the bearing surface of the bonnet and arcuate sealer segments integral with the annular section and spaced apart to engage two opposite sides of the driver segment in sealing relationship therewith.

10. A structure according to claim 9 in which the driver end includes a packing member sealably engaged with the bonnet.

11. A structure according to claim 9 in which the flat cylindrical land surface is composed by a disc of synthetic resinous material.

12. A valve structure comprising a connector casing for connecting together fluid conduit members, said connecting casing being formed with an intermediate body portion and tubular inlet and outlet members extending outwardly from the intermediate body portion at two opposite sides thereof, said intermediate body portion being recessed to provide a cylindrical chamber whose central axis intersects the axes of said inlet and outlet members at right angles thereto and defines fluid apertures through which a fluid may flow from the tubular inlet through the intermediate body portion into the tubular outlet, a disc of synthetic resinous material located in one end of the chamber, a cylindrical sealing element rotatably received in said chamber in sealing relationship with all surfaces which define the chamber and substantially filling the space in said chamber, said sealing element including an annular section and spaced apart arcuate segments integral with the end section and a seal retainer driver sealably fitted between the arcuate segments and having curved end surfaces which are complementary with the curved spaces of the arcuate segments, said annular section and spaced apart arcuate segments being movable with the driver and said driver having a fluid passageway extending between its curved end surfaces, closure means for detachably securing the sealing element and the driver in the chamber and means forming a part of the said driver extending through the annular end section of the sealing element and the closure means for imparting rotative movement to the sealing element.

References Cited
UNITED STATES PATENTS

| | | | |
|---|---|---|---|
| 2,649,275 | 8/1953 | Noyes | 251—314 X |
| 2,708,094 | 5/1955 | Heinen | 251—314 X |
| 2,713,987 | 7/1955 | Schenck | 251—317 X |
| 2,994,504 | 8/1961 | Reed | 251—317 X |
| 3,244,398 | 4/1966 | Scaramucci | 251—317 X |

WILLIAM F. O'DEA, *Primary Examiner.*

D. R. MATTHEWS, *Assistant Examiner.*